US010733461B2

(12) United States Patent
Oe et al.

(10) Patent No.: US 10,733,461 B2
(45) Date of Patent: Aug. 4, 2020

(54) INFORMATION PROCESSING DEVICE, INFORMATION PROVIDING SYSTEM, AND INFORMATION PROVIDING METHOD

(71) Applicant: TOYOTA JIDOSHA KABUSHIKI KAISHA, Toyota-shi, Aichi-ken (JP)

(72) Inventors: Yoshihiro Oe, Kawasaki (JP); Hirofumi Kamimaru, Fukuoka (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 25 days.

(21) Appl. No.: 16/046,472

(22) Filed: Jul. 26, 2018

(65) Prior Publication Data
US 2019/0080182 A1    Mar. 14, 2019

(30) Foreign Application Priority Data
Sep. 13, 2017 (JP) .................................. 2017-176119

(51) Int. Cl.
*G06K 9/00* (2006.01)
(52) U.S. Cl.
CPC ..... *G06K 9/00805* (2013.01); *G06K 2209/27* (2013.01)
(58) Field of Classification Search
CPC .............. G06K 9/00805; G06K 2209/27
See application file for complete search history.

(56) References Cited

U.S. PATENT DOCUMENTS

2015/0091740 A1* 4/2015 Bai .................. G08B 21/06
340/901
2018/0343605 A1* 11/2018 Wu .................. H04W 4/46

FOREIGN PATENT DOCUMENTS

| JP | 2009-086982 A | 4/2009 |
| JP | 2012-048537 A | 3/2012 |
| JP | 2016-173652 A | 9/2016 |

* cited by examiner

*Primary Examiner* — Brian A Zimmerman
*Assistant Examiner* — Kevin Lau
(74) *Attorney, Agent, or Firm* — Hunton Andrews Kurth LLP

(57) ABSTRACT

An information processing device includes a first communication control unit that receives a first signal from one or more terminals carried by one or more detection objects around a vehicle, a detection unit that detects the detection objects in a predetermined range from image data created by photographing the predetermined range that can be seen from the vehicle, a determination unit that determines whether the one or more detection objects can be seen from the vehicle based on a detection result generated by the detection unit and the first signal received by the first communication control unit, and an information providing unit that provides information on a detection object that cannot be seen from the vehicle when the one or more detection objects include the detection object that cannot be seen from the vehicle.

8 Claims, 13 Drawing Sheets

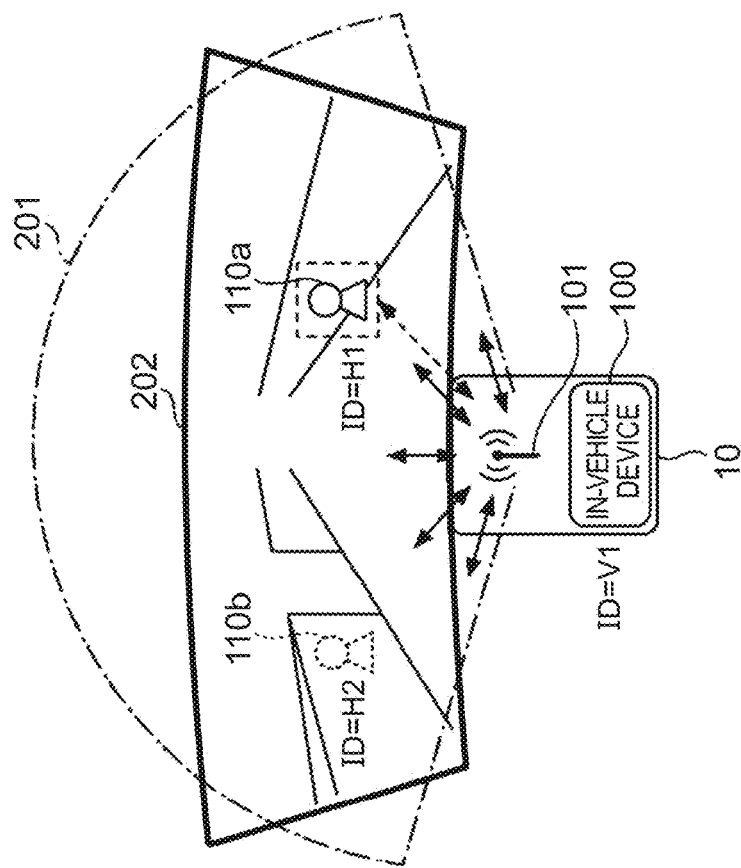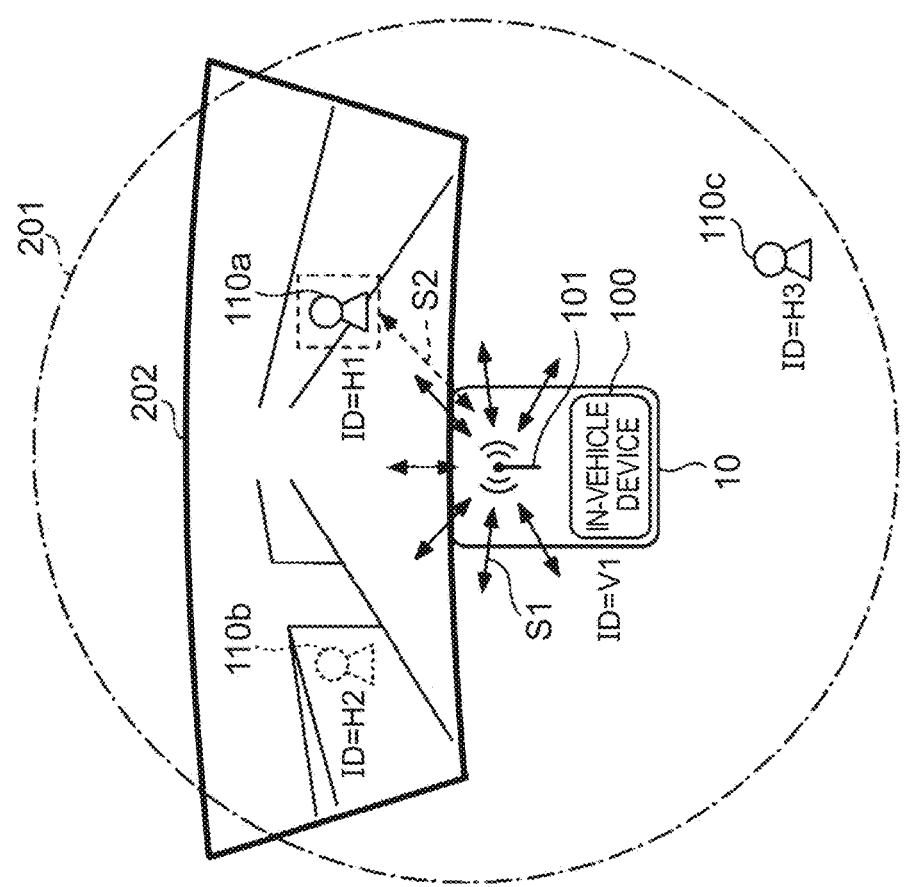

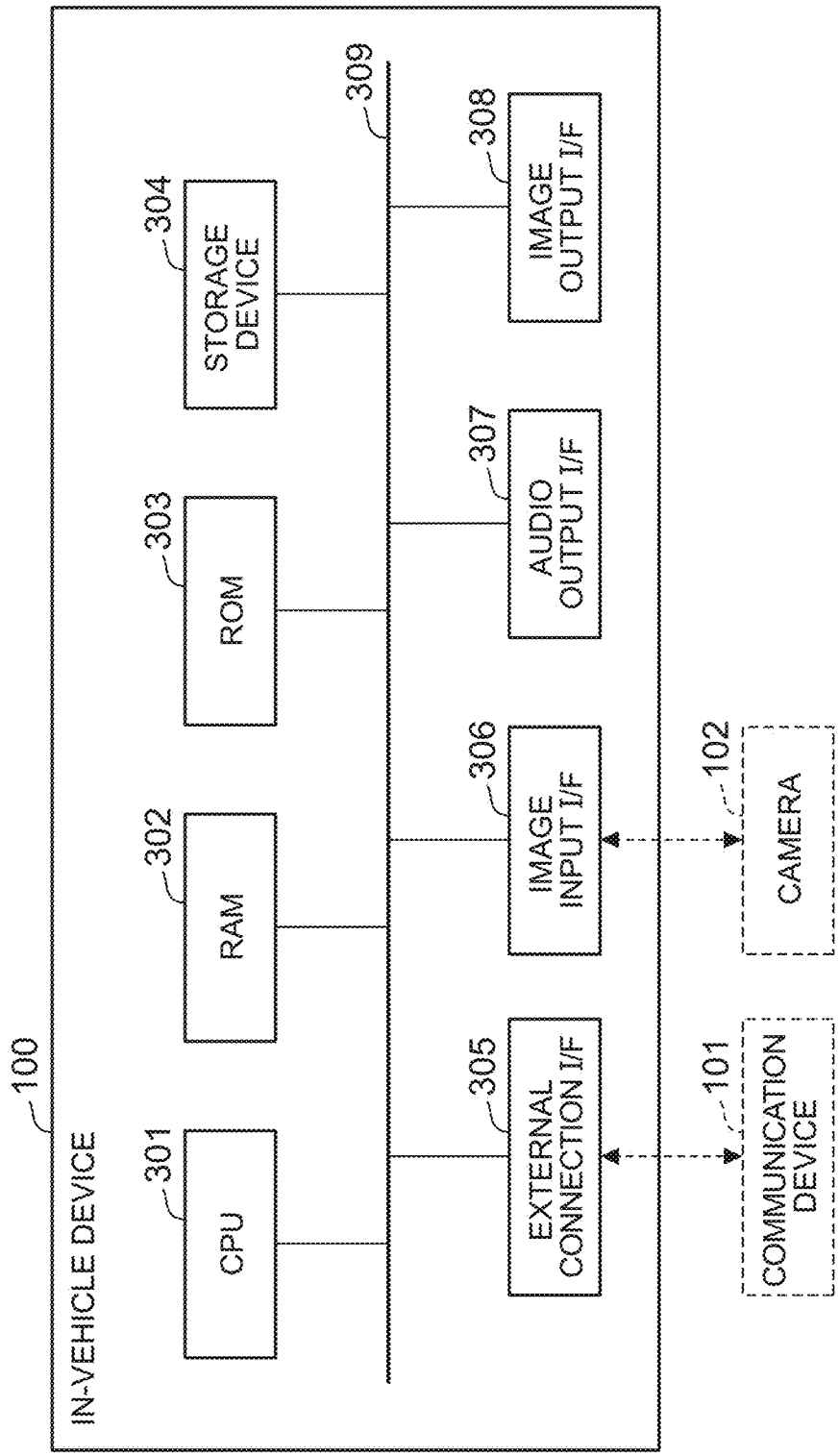

FIG. 6A

| TERMINAL ID | TERMINAL TYPE | POSITION INFORMATION | RECEPTION TIME | ... |
|---|---|---|---|---|
| H1 | PEDESTRIAN TERMINAL | x1, y1, z1 | h1:m1:s1:xx | ... |
| H2 | PEDESTRIAN TERMINAL | x2, y2, z2 | h2:m2:s2:yy | ... |
| H3 | PEDESTRIAN TERMINAL | x3, y3, z3 | h3:m3:s3:zz | ... |
| ... | ... | ... | ... | ... |

| TRACKING ID | TERMINAL ID | DETECTED COORDINATES | DETECTION TIME | ... |
|---|---|---|---|---|
| xx01 | H1 | x001, y001 | hh:mm:ss:xx | ... |
| ... | ... | ... | ... | ... |

602

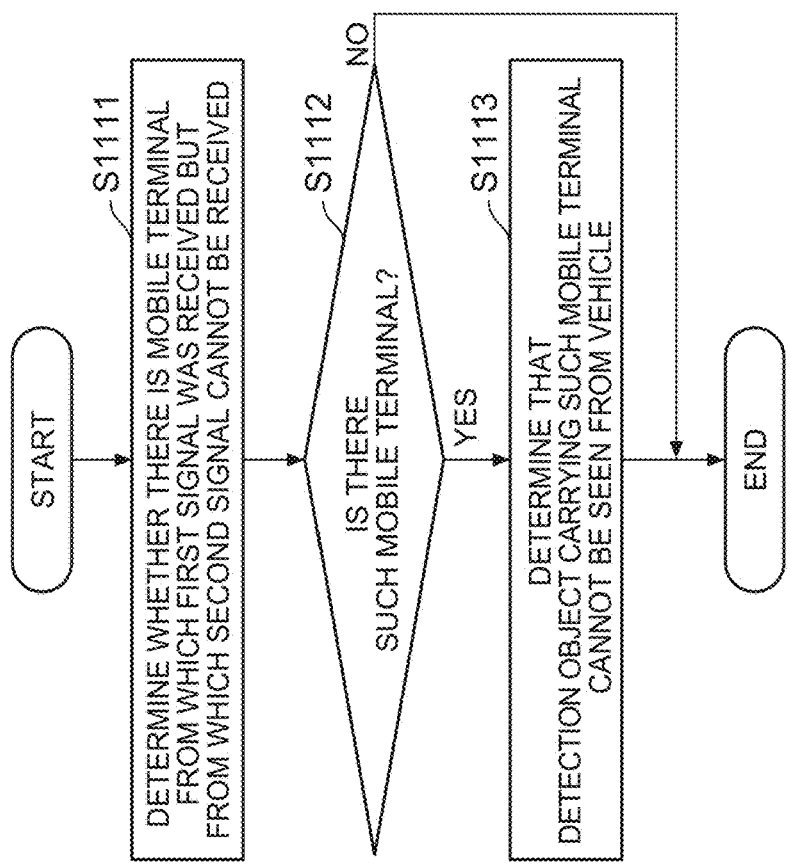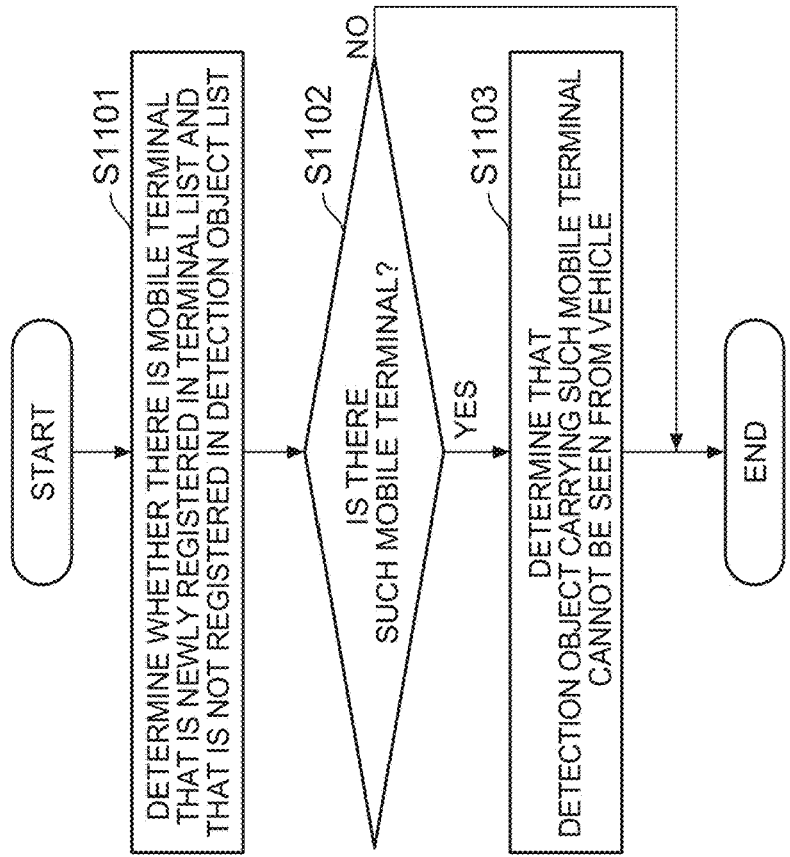

FIG. 13A
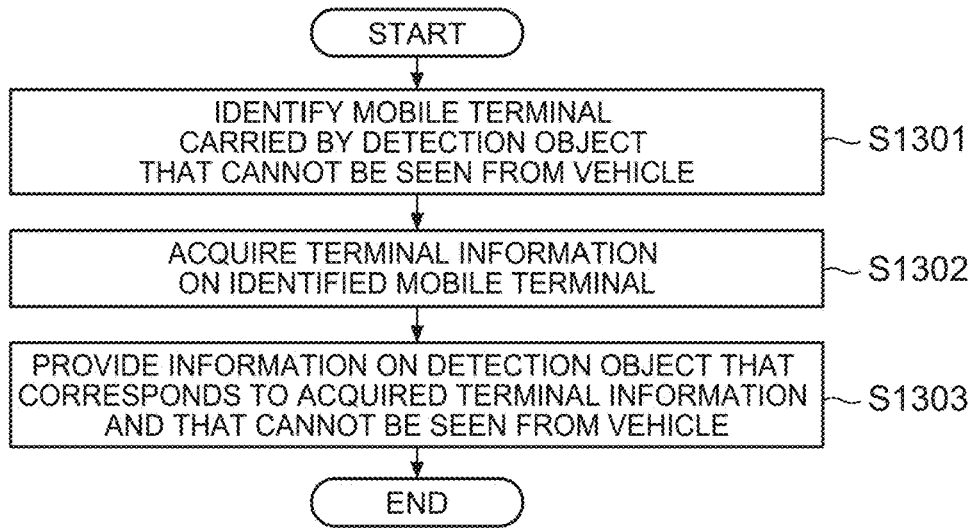
FIG. 13B
| TERMINAL TYPE | VOICE MESSAGE | ALARM SOUND | ... |
|---|---|---|---|
| PEDESTRIAN TERMINAL | THERE IS A PEDESTRIAN IN INVISIBLE PLACE | ALARM SOUND 1 | ... |
| KID PHONE | THERE IS A CHILD IN INVISIBLE PLACE | ALARM SOUND 2 | ... |
| BICYCLE PHONE | THERE IS A BICYCLE IN INVISIBLE PLACE | ALARM SOUND 3 | ... |
| ... | ... | ... | ... |
FIG. 13C
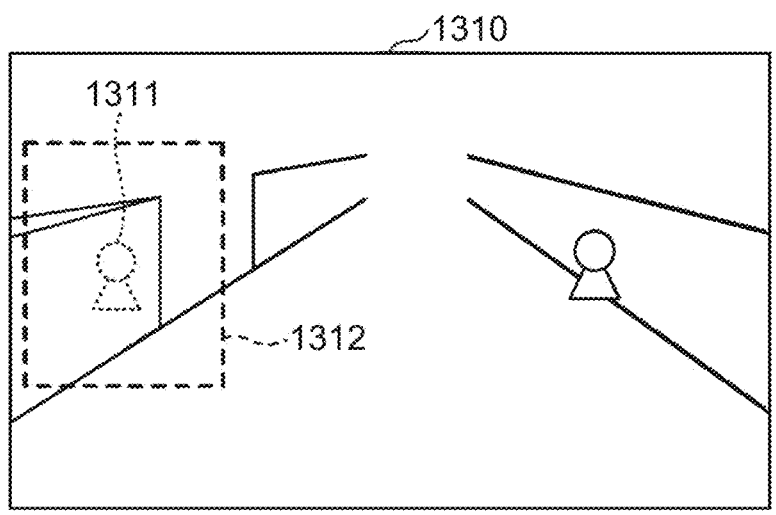

INFORMATION PROCESSING DEVICE, INFORMATION PROVIDING SYSTEM, AND INFORMATION PROVIDING METHOD

INCORPORATION BY REFERENCE

The disclosure of Japanese Patent Application No. 2017-176119 filed on Sep. 13, 2017 including the specification, drawings and abstract is incorporated herein by reference in its entirety.

BACKGROUND

1. Technical Field

The present disclosure relates to an information processing device, an information providing system, and an information providing method.

2. Description of Related Art

There is known a technique that, when there is a pedestrian within a predetermined range from a vehicle, allows a driver to recognize the presence of the pedestrian early by displaying an image, which represents the pedestrian, at a position that can be seen from the driver of the vehicle (see, for example, Japanese Patent Application Publication No. 2016-173652 (JP 2016-173652 A)).

SUMMARY

The technique disclosed in Japanese Patent Application Publication No. 2016-173652 (JP 2016-173652 A) is a method for lighting the light-emitting diode on the side on which a pedestrian approaches the vehicle to enable the driver to recognize the pedestrian. Therefore, there is a problem that the information on a pedestrian in a place that cannot be seen from the vehicle cannot be provided.

Note that such a problem is common to an in-vehicle device (information processing device) that provides information not only when the detection object is a pedestrian but also when the detection object is a predetermined detection object (for example, a child, an elderly person, a two-wheeled vehicle, etc.) around the vehicle.

An embodiment of the present disclosure provides an information processing device mounted on a vehicle for providing the information on a predetermined detection object around the vehicle, wherein the information processing device provides the information on a detection object that cannot be seen from the vehicle.

A first aspect of the present disclosure is an information processing device amounted on a vehicle. The information processing device includes a first communication control unit configured to receive a first signal from one or more terminals carried by one or more detection objects around the vehicle, a detection unit configured to detect the detection objects in a predetermined range from image data created by photographing the predetermined range that can be seen from the vehicle, a determination unit configured to determine whether the one or more detection objects can be seen from the vehicle based on a detection result generated by the detection unit and the first signal received by the first communication control unit, and an information providing unit configured to provide information on a detection object that cannot be seen from the vehicle when the one or more detection objects include the detection object that cannot be seen from the vehicle.

The configuration described above allows the information processing device to receive the first signal from one or more terminals carried by one or more detection objects around the vehicle, making it possible to know that there is one or more detection objects around the vehicle. The information processing device also uses the image data, created by photographing the predetermined range that can be seen from the vehicle, to find there are detection objects that can be seen from the vehicle. This allows the information processing device to determine whether one or more detection objects around the vehicle can be seen from the vehicle and to provide information (for example, alarm message, voice message, etc.) on the detection objects that cannot be seen from the vehicle.

The information processing device may further include a calculation unit configured to calculate a direction of each of the detection objects, detected by the detection unit, with respect to the vehicle, and a second communication control unit configured to carry out directional communication in the direction calculated by the calculation unit and configured to acquire a second signal from the terminal that is present in the direction. The determination unit may be configured to determine whether the one or more detection objects can be seen from the vehicle, using the first signal received by the first communication control unit and the second signal acquired by the second communication control unit.

The configuration described above allows the determination unit to determine that the detection objects carrying the terminals from which the second signal was received by the second communication control unit can be seen from the vehicle, thus making it possible to correctly determine whether one or more detection objects can be seen from the vehicle.

In the information processing device, the determination unit may be configured to determine that the detection object carrying a first predetermined terminal cannot be seen from the vehicle. The first predetermined terminal may be a terminal from which the first signal was received by the first communication control unit but from which the second signal cannot be received by the second communication control unit.

The configuration described above allows the determination unit to correctly determine that there are one or more detection objects but there is a detection object that cannot be seen from the vehicle.

The information processing device described above may further include a first list management unit configured to manage a first list in which information on a second predetermined terminal and information on a detection object carrying the second predetermined terminal are stored. The second predetermined terminal may be a terminal from which the first signal was received by the first communication control unit and from which the second signal was also received by the second communication control unit. The calculation unit may be configured to exclude the detection objects that were detected by the detection unit and are stored in the first list from the calculation of the direction.

The configuration described above allows the information processing device to exclude an already detected detection object from the calculation processing performed by the calculation unit. This configuration, therefore, reduces the load of the information processing device and, at the same time, increases the processing speed of the information processing device.

The information processing device may further include a second list management unit configured to manage a second list in which information on the terminals from which the first signal was received by the first communication control unit is stored. The determination unit is configured to determine that the detection object carrying a third predetermined terminal cannot be seen from the vehicle. The third predetermined terminal may be a terminal that is newly registered in the second list and that is not registered in the first list.

The configuration described above allows the information processing device to exclude a terminal registered in the second list, but not in the first list, from the determination processing performed by the determination unit. This configuration, therefore, reduces the load of the information processing device and, at the same time, increases the processing speed of the information processing device.

In the information processing device, the first signal may include identification information that identifies the terminal. When the one or more detection objects include the detection object that cannot be seen from the vehicle, the information providing unit may be configured to send information to the first predetermined terminal indicating that the detection object cannot be seen from the vehicle.

The configuration described above allows the information processing device to provide information, which is about a detection object that cannot be seen from the vehicle, to a terminal carried by a detection object that is one of the one or more detection objects and that cannot be seen from the vehicle.

In the information processing device, the information providing unit may be configured to provide information indicating that there is the detection object that cannot be seen from the vehicle to an occupant of the vehicle when the one or more detection objects include the detection object that cannot be seen from the vehicle.

The configuration described above allows the information processing device to provide information, which is about a detection object that cannot be seen from the vehicle, to an occupant of the vehicle.

In the information processing device, the first signal may include terminal information on the terminal. The information providing unit may be configured to provide information indicating that there is the detection object that cannot be seen from the vehicle and corresponding to the terminal information on the terminal carried by the detection object that cannot be seen from the vehicle.

The configuration described above allows the information processing device to provide information to an occupant of the vehicle the information corresponding to the terminal type of the terminal carried by the detection object that cannot be seen from the vehicle and indicating that there is a detection object that cannot be seen from the vehicle.

A second aspect of the present disclosure is an information providing system configured to provide information on detection objects around a vehicle. The information providing system comprising. The information providing system includes a first communication control unit configured to receive a first signal from one or more terminals carried by one or more detection objects around the vehicle, a detection unit configured to detect the detection objects in a predetermined range from image data created by photographing the predetermined range that can be seen from the vehicle, a determination unit configured to determine whether the one or more detection objects can be seen from the vehicle based on a detection result generated by the detection unit and the first signal received by the first communication control unit, and an information providing unit configured to provide information on a detection object that cannot be seen from the vehicle when the one or more detection objects include the detection object that cannot be seen from the vehicle.

The configuration described above allows the information processing device that is mounted on the vehicle for providing information on predetermined detection objects around the vehicle to provide information on detection objects that cannot be seen from the vehicle.

A third aspect of the present disclosure is an information providing method. The information providing method includes: receiving, by an information processing device mounted on a vehicle, a first signal from one or more terminals carried by one or more detection objects around the vehicle; detecting, by the information processing device, the detection objects in a predetermined range from image data created by photographing the predetermined range that can be seen from the vehicle; determining, by the information processing device, whether the one or more detection objects can be seen from the vehicle, based on a detection result generated in the step of detecting and the first signal received in the step of receiving the first signal; and providing, by the information processing device, information on a detection object that cannot be seen from the vehicle when the one or more detection objects include the detection object that cannot be seen from the vehicle.

The configuration described above allows the information processing device, mounted on a vehicle for providing information on predetermined detection objects around the vehicle, to provide information on a detection object that cannot be seen from the vehicle.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 2A is a diagram showing an operation of the information providing system according to one embodiment;

FIG. 2B is a diagram showing an operation of the information providing system according to one embodiment;

FIG. 3 is a diagram showing an example of a hardware configuration of an in-vehicle device according to one embodiment;

FIG. 6A is a diagram showing an example of a second list managed by the in-vehicle device according to one embodiment;

FIG. 6B is a diagram showing an example of a first list managed by the in-vehicle device according to one embodiment;

FIG. 11A is a flowchart showing an example of determination processing according to one embodiment;

FIG. 11B is a flowchart showing an example of the determination processing according to one embodiment;

FIG. 13A is a flowchart showing an example of the information providing processing for an occupant of a vehicle according to one embodiment;

FIG. 13B is a diagram showing an example of information provision to an occupant of a vehicle according to one embodiment; and FIG. 13C is a diagram showing an example of information provision to an occupant of a vehicle according to one embodiment.

DETAILED DESCRIPTION OF EMBODIMENTS

A mode for carrying out the present disclosure will be described in detail below with reference to the drawings.

Figure 1:
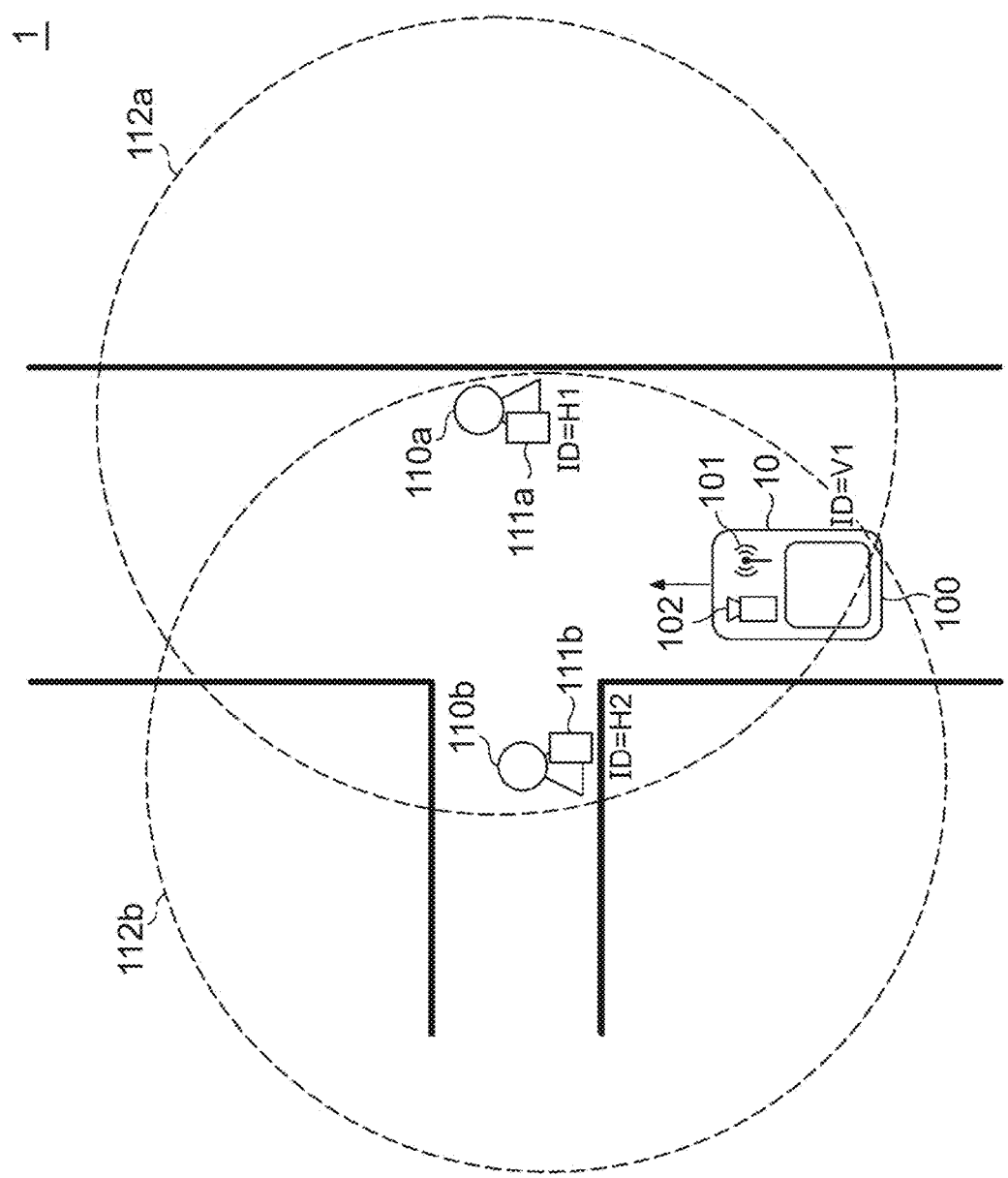
FIG. 1 is a diagram showing an example of a system configuration of an information providing system according to one embodiment.

FIG. 1 is a diagram showing an example of a system configuration of an information providing system according to one embodiment. An information providing system 1, mounted on a vehicle 10 such as an automobile, provides the information on a predetermined detection object around the vehicle 10 to an occupant of the vehicle 10 and to pedestrians 110a and 110b. For example, examples of the information on a detection object include the following information: the information that notifies the occupant of the vehicle 10 that there is a pedestrian that cannot be seen from the vehicle 10 and the information that notifies mobile terminals 111a and 111b of the pedestrians 110a and 110b that the pedestrians 110a and 110b cannot be seen from the vehicle 10.

The information providing system 1 includes an in-vehicle device 100, a communication device 101, and a camera 102 that are mounted on the vehicle 10 and the mobile terminals 111a and 111b carried by the pedestrians 110a and 110b. The communication device 101 is a device that allows the in-vehicle device 100 to communicate wirelessly with the mobile terminals 111a and 111b. The communication device 101 may be implemented, for example, by the Data Communication Module (DCM).

In the following description, a "pedestrian 110" is used to indicate a pedestrian that is one of the pedestrians 110a and 110b. Similarly, a "mobile terminal 111" is used to indicate a mobile terminal that is one of the mobile terminals 111a and 111b.

The pedestrian 110 who carries (possesses) the mobile terminal 111 is an example of one or more detection objects around the vehicle 10, and the mobile terminal 111 is an example of one or more terminals carried by one or more detection objects around the vehicle 10. Although it is assumed in the description below that one or more detection objects around the vehicle 10 are the pedestrians 110 each carrying the mobile terminal 111, the detection object may be a specific pedestrian (for example, a child, an elderly person) or a predetermined object (for example, a two-wheeled vehicle) carrying the mobile terminal 111.

The mobile terminal 111 is, for example, an information terminal such as a smartphone, a mobile phone, or a wearable terminal carried by the pedestrian 110. The mobile terminal 111 can wirelessly communicate with the communication device 101 included in the vehicle 10.

The mobile terminal 111 sends a radio signal for short-range communication (hereinafter referred to as a first signal) in a predetermined communication range in the broadcast mode without specifying the destination. This radio signal includes the identification information (hereinafter referred to as a terminal ID) for identifying the mobile terminal 111.

In the example shown in FIG. 1, the mobile terminal 111a, carried by the pedestrian 110a, sends the first signal, which includes the terminal ID "H1" of the mobile terminal 111a, in a communication range 112a. Similarly, the mobile terminal 111b, carried by the pedestrian 110b, sends the first signal, which includes the terminal ID "H2" of the mobile terminal 111b, in a communication range 112b.

Also, when the request signal that is sent from the communication device 101 of the vehicle 10 and that includes the identification information "V1" identifying the communication device 101 is received, the mobile terminal 111 sends the radio signal that includes the terminal ID of the mobile terminal 111 (hereinafter referred to as a second signal) to the communication device 101 of the requesting source.

The in-vehicle device 100 is an information processing device mounted on the vehicle 10. The in-vehicle device 100 is, for example, an information device such as a car navigation device or an in-vehicle device such as an in-vehicle Electric Control Unit (ECU). The in-vehicle device 100 uses the communication device 101 to receive the first signal from the mobile terminal 111 of the pedestrian 110 around the vehicle 10. This first signal allows the in-vehicle device 100 to recognize the presence of the pedestrian 110 who is around the vehicle 10 and who carries the mobile terminal 111.

Furthermore, the in-vehicle device 100 analyzes image data created by photographing, using the camera 102, a predetermined range that can be seen from the vehicle 10 (hereinafter referred to as a photographing range of the camera 102). As a result of this analysis, the in-vehicle device 100 detects a pedestrian included in the image data.

Furthermore, the in-vehicle device 100 calculates the direction of the pedestrian detected from the image data and, in the calculated direction, sends the request signal using the communication device 101 via the directional wireless signal. As a result, if the detected pedestrian is the pedestrian 110 carrying the mobile terminal 111, the second signal including the terminal ID of the mobile terminal 111 is sent from the mobile terminal 111 to the in-vehicle device 100. The in-vehicle device 100 receives the second signal sent from the mobile terminal 111 using the communication device 101. Receiving the second signal in this way allows the in-vehicle device 100 to identify that the pedestrian detected from the image data is the pedestrian 110 that carries the mobile terminal 111.

FIG. 2A and FIG. 2B are diagrams showing an operation of the information providing system according to one embodiment. In FIG. 2A, the in-vehicle device 100 receives the first signals from the mobile terminals 111, carried by the pedestrians 110a, 110b, and 110c within the communication range 201 of S1, via the first wireless communication (hereinafter referred to as S1). The first signals received in this way allow the in-vehicle device 100 to know that the pedestrians 110, who carry the mobile terminals 111 with the terminal IDs "H1", "H2", and "H3", are around the vehicle 10.

In addition, the in-vehicle device 100 analyzes the image data, photographed by the camera 102, to detect the pedestrian 110a within a photographing range 202 of the camera 102. Furthermore, the in-vehicle device 100 calculates the direction of the pedestrian 110a with respect to the vehicle 10 and, in the calculated direction, sends the request signal via the second directional wireless communication (hereinafter referred to as S2). After that, the in-vehicle device 100 receives the second signal, sent from the mobile terminal 111a of the pedestrian 110a, via the communication device 101.

At this time, the second signal, sent from the mobile terminal 111a of the pedestrian 110a, includes the terminal ID "H1" of the mobile terminal 111a. Therefore, the in-vehicle device 100 determines that the pedestrian 110a, who is one of the pedestrians 110 carrying the mobile terminals 111 with the terminal IDs "H1", "H2", and "H3" from which the first signal was received and who carries the mobile terminal 111 with the terminal ID "H1" from which the second signal was received, can be seen from the vehicle 10. On the other hand, the in-vehicle device 100 determines that the pedestrians 110b and 110c, who carry the mobile terminals 111 with the terminal IDs "H2" and "H3" from which the second signal was not received, cannot be seen from the vehicle 10.

In this way, if it is determined that there are the pedestrians 110a and 110b, and 110c are around the vehicle 10 but there are one or more pedestrians 110 who cannot be seen from the vehicle 10, the in-vehicle device 100 provides the information, which indicates that there are one or more the pedestrians 110 who cannot be seen from the vehicle 10, to the occupant of the vehicle 10.

For example, the in-vehicle device 100 outputs a warning sound or a voice message, which indicates that there is the pedestrian 110 who cannot be seen from the vehicle 10 (e.g., "there is a pedestrian in invisible place", etc.), from the speaker provided in the vehicle 10 to notify the occupant of the vehicle 10 about the situation.

Preferably, the in-vehicle device 100 sends the information, which indicates that the pedestrian 110 cannot be seen from the vehicle 10, to the mobile terminals 111b and 111c, using the terminal IDs "H2" and "H3" of the mobile terminals 111b and 111c carried by the pedestrians 110 who are determined not to be seen from the vehicle 10.

The mobile terminals 111b and 111c, which receive the information indicating that the pedestrian 110 cannot be seen from the vehicle 10, output an alarm sound, a vibrator, or a voice message to notify the pedestrians 110 carrying the mobile terminals 111b and 111c that the pedestrian 110 cannot be seen from the vehicle 10.

As described above, the information providing system 1 according to this embodiment uses the in-vehicle device 100, which is mounted on the vehicle 10 to provide the information on a predetermined detection object around the vehicle, to provide the information on a detection object that cannot be seen from the vehicle 10. The information notifying the occupant of the vehicle 10 that there is a pedestrian who cannot be seen from the vehicle 10 and the information notifying that the mobile terminal 111 of the pedestrian 110 that the pedestrian 110 cannot be seen from the vehicle 10 are examples of the information related to a detection object.

Note that, as shown in FIG. 2B, the communication range 201 of S1 (first wireless communication) may be the predetermined range corresponding to the photographing range 202 of the camera 102. In this case, the pedestrians 110 having little influence on the traveling route (such as the pedestrian 110c in FIG. 2A) can be excluded from the detection objects.

Although the photographing range 202 of the camera 102 is in front of the vehicle 10 in the example in FIG. 2A and FIG. 2B, the photographing range 202 of the camera 102 may be a range to the side of, or behind, the vehicle 10 as long as the photographing range 202 is within a range that can be seen from the driver of the vehicle 10.

FIG. 3 is a diagram showing an example of a hardware configuration of the in-vehicle device according to one embodiment. The in-vehicle device 100 has a configuration of a general computer and includes, for example, a Central Processing Unit (CPU) 301, a Random Access Memory (RAM) 302, a Read Only Memory (ROM) 303, a storage device 304, an external connection interface (I/F) 305, an image input I/F 306, an audio output I/F 307, an image output I/F 308, and a system bus 309.

The CPU 301 is an arithmetic device that reads programs and data, stored in the ROM 303 and the storage device 304, into the RAM 302 for executing the processing to implement the functions of the in-vehicle device 100. The RAM 302 is a volatile memory used as a work area of the CPU 301. The ROM 303 is a nonvolatile memory that holds programs and data even when the power is turned off. The storage device 304 is a storage device, such as a Hard Disk Drive (HDD) or a Solid State Drive (SSD), in which the Operation System (OS), programs, and various data are stored.

The external connection I/F 305 is an interface for connecting an external device, such as the communication device 101, to the in-vehicle device 100. The image input I/F 306 is an interface for connecting a photographing device, such as the camera 102, to the in-vehicle device 100.

The audio output I/F 307 is an interface for outputting a sound signal to a speaker provided in the vehicle 10 and to an electronic device that outputs sound to a speaker. The in-vehicle device 100 may have a sound output unit, in place of the audio output I/F 307, for outputting sounds.

The image output I/F 308 is an interface for outputting an image to a display device provided in a vehicle and to an electronic device having a display device. The in-vehicle device 100 may have an image display unit, in place of the image output I/F 308, for displaying an image.

The system bus 309, commonly connected to each of the above-described components, transmits an address signal, a data signal, various control signals, and so on.

Figure 4:
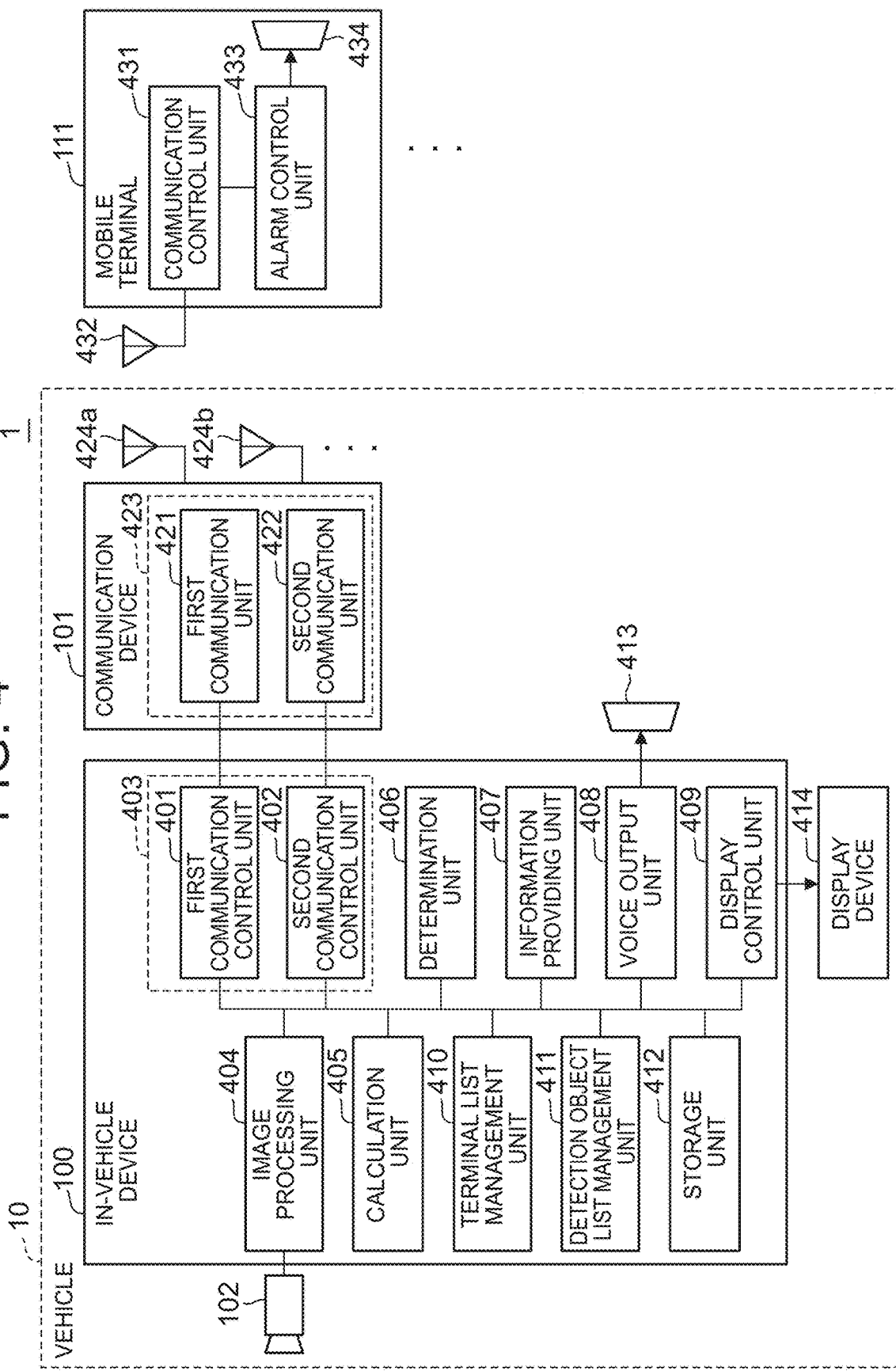
FIG. 4 is a diagram showing an example of a functional configuration of the information providing system according to one embodiment.

FIG. 4 is a diagram showing an example of a functional configuration of the information providing system according to one embodiment.

The information providing system 1 includes the in-vehicle device 100, communication device 101, camera 102, speaker 413, and display device 414 that are mounted on the vehicle 10 and the mobile terminal 111 capable of communicating with the in-vehicle device 100 via the communication device 101.

The camera 102 is a photographing device mounted on the vehicle 10. As shown in FIG. 2A and FIG. 2B, the camera 102 photographs the predetermined photographing range 202 that can be seen from the vehicle 10 and outputs the photographed image data to the in-vehicle device.

The speaker 413 converts the sound signal, such as an alarm sound or a voice message, output from the in-vehicle device 100, into sound and outputs the converted sound.

The display device 414 displays a display screen output from the in-vehicle device 100.

The in-vehicle device (information processing device) 100 includes a first communication control unit 401, a second communication control unit 402, an image processing unit 404, a calculation unit 405, a determination unit 406, an information providing unit 407, a voice output unit 408, a display control unit 409, a terminal list management unit 410, a detection object list management unit 411, and a storage unit 412.

The in-vehicle device 100 implements the above-described functional configuration by executing programs, stored in a recording medium such as the ROM 303 and the storage device 304, in the CPU 301 shown in FIG. 3. At least a part of each of the above functional configurations may be implemented by hardware.

The first communication control unit 401, implemented by a program executed by the CPU 301 shown in FIG. 3, receives the first signal sent from the mobile terminal 111 of the pedestrian 110 around the vehicle 10 via S1 (first wireless communication) performed by the communication device 101. The first signal sent from the mobile terminal 11 includes at least the terminal ID of the mobile terminal 111.

Preferably, the first signal sent from the mobile terminal 111 includes the terminal information such as the terminal type of the mobile terminal 111 (for example, a pedestrian terminal) and the position information on the mobile terminal 111.

The second communication control unit 402, implemented by a program executed by the CPU 301 shown in FIG. 3, acquires the second signal from the mobile terminal 111 that is present in the direction calculated by the calculation unit 405 via S2 (second wireless communication) performed by the communication device 101. For example, the second communication control unit 402 sends the request signal via directional S2 into the direction calculated by the calculation unit 405 and then receives the second signal sent from the mobile terminal 111 that is present in the direction in which the request signal was sent. The second signal sent from the mobile terminal 111 includes at least the terminal ID of the mobile terminal 111.

The first communication control unit 401 and the second communication control unit 402 may be implemented by one communication control unit 403.

The image processing unit (detection unit) 404, implemented by a program executed by the CPU 301 shown in FIG. 3, analyzes the image data obtained by the camera 102 that photographs the photographing range 202 that can be seen from the vehicle 10. Then, based on the analyzed image, the image processing unit 404 detects a detection object within the photographing range 202. For example, the image processing unit 404 detects a "pedestrian" (an example of a detection object), included in image data, by using a known pattern matching technique.

It should be noted that the "pedestrian", detected by the image processing unit 404, may include not only the pedestrian 110 who carries the mobile terminal 111 but also the pedestrian 110 who does not carry the mobile terminal 111.

The calculation unit 405, implemented by a program executed by the CPU 301 shown in FIG. 3, calculates the direction of a detection object, detected by the image processing unit 404, with respect to the vehicle 10.

Figure 5:
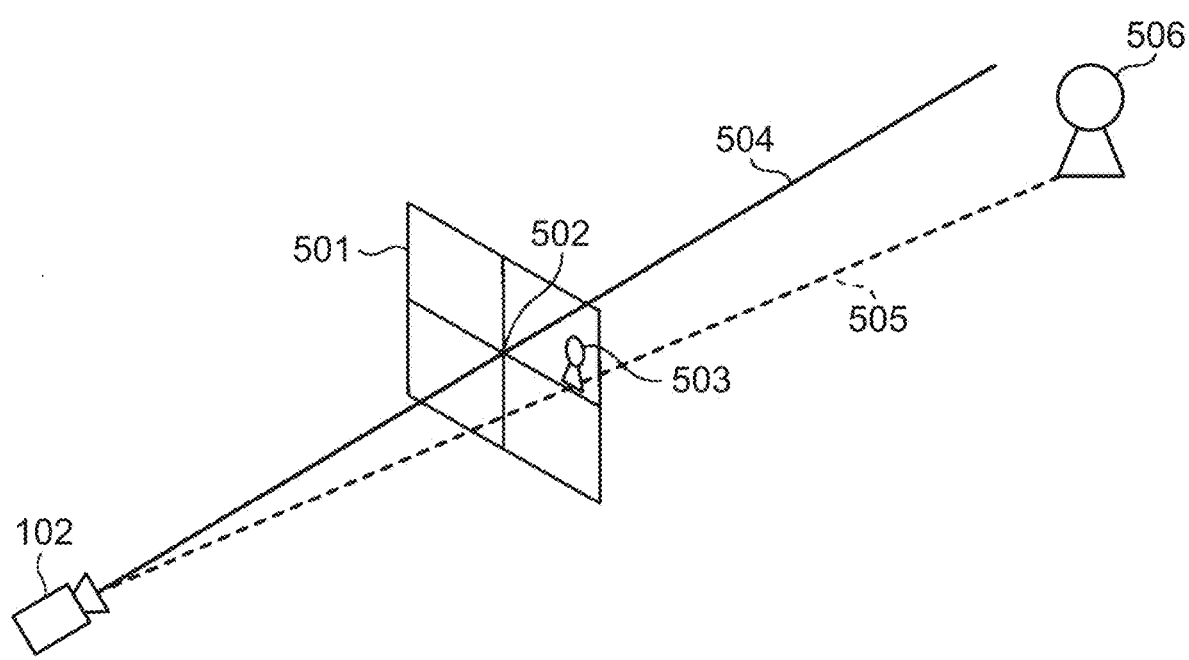
FIG. 5 is a diagram showing a method of calculating a direction of a detection object according to one embodiment.

FIG. 5 is a diagram showing a method of calculating the direction of a detection object according to one embodiment. For example, the calculation unit 405 stores the correspondence information in the storage unit 412 in advance. The correspondence information is the information that associates each of a plurality of coordinate ranges, whose origin is the center point 502 of the image 501 photographed by the camera 102, with a direction with respect to the orientation 504 of the camera 102 in each coordinate range. Using the correspondence information stored in the storage unit 412, the calculation unit 405 can calculate a direction 505 of an actual detection object 506 with respect to the orientation 504 of the camera 102, based on the coordinates of the detection object 503 detected in the image 501. After that, based on the mounting angle of the camera 102 with respect to the vehicle 10, the calculation unit 405 can calculate the direction of the detection object, detected by the image processing unit 404, with respect to the vehicle 10.

Note that this method is an example only. The calculation unit 405 may use an arbitrary method to calculate the direction of a detection object, detected by the image processing unit 404, with respect to the vehicle 10.

The determination unit 406 is implemented by a program executed by the CPU 301 shown in FIG. 3. The determination unit 406 determines whether the pedestrian 110 who is around the vehicle 10 and carries the mobile terminal 111 can be seen from the vehicle 10, based on the detection result of the detection object detected by the image processing unit 404 and on the first signal received by the first communication control unit 401.

For example, in the example in FIG. 2A, the first communication control unit 401 receives the first signal from the mobile terminal 111a, 111b, and 111c carried by the pedestrians 110a, 110b, and 110c. On the other hand, only the pedestrian 110a is detected from the image data of the photographing range 202 photographed by the camera 102. In this case, the determination unit 406 can determine that, though there are the pedestrians 110a, 110b, and 110c around the vehicle 10, at least two of the pedestrians 110 cannot be seen.

Preferably, the determination unit 406 uses the first signals received by the first communication control unit 401 and the second signals acquired by the second communication control unit 402 to determine whether the pedestrians 110 around the vehicle 10 can be seen from the vehicle 10.

For example, the determination unit 406 checks the terminal ID, included in the first signal received by the first communication control unit 401, to know which pedestrian 110 is around the vehicle 10. Also, the determination unit 406 checks the terminal ID, included in the second signal acquired by the second communication control unit 402, to know which pedestrian 110 can be seen from the vehicle 10. By doing so, the determination unit 406 can determine that the pedestrians 110 carrying the mobile terminals 111 from which the first signal was received by the first communication control unit 401 but from which the second signal cannot be received by the second communication control unit 402 are pedestrians 110 who cannot be seen from the vehicle 10. An example of the actual processing by the determination unit 406 will be described later with reference to the flowchart.

The information providing unit 407 is implemented by a program executed by the CPU 301 shown in FIG. 3. The information providing unit 407 provides the information related to the pedestrians 110 who cannot be seen from the vehicle 10, if there are pedestrians 110 who carry the mobile terminal 111 around the vehicle 10 and if some of the pedestrians 110 cannot be seen from the vehicle 10.

For example, if there are pedestrians 110 around the vehicle 10 and if some of the pedestrians 110 cannot be seen from the vehicle 10, the information providing unit 407 uses the voice output unit 408 to output an alarm sound or a voice messages from the speaker 413. In addition, the information providing unit 407 may use the display control unit 409 to cause the display device 414 to display a display screen indicating that there are pedestrians 110 who cannot be seen from the vehicle 10.

Preferably, if it is determined that there are the pedestrians 110 around the vehicle 10 and if some of the pedestrians 110 cannot be seen from the vehicle 10, the information providing unit 407 sends the notification information, which indicates that the pedestrian 110 cannot be seen from the vehicle 10, to each of the mobile terminals 111 of the pedestrians 110 who cannot be seen. This information allows the mobile terminal 111, which has received the notification information, to output an alarm sound or a voice message indicating that the pedestrian 110 cannot be seen from the vehicle 10.

The voice output unit 408, implemented by a program executed by the CPU 301 shown in FIG. 3, uses the speaker 413 to output an alarm sound or a voice message, which indicates that there is the pedestrian 110 who cannot be seen from the vehicle 10, under control of the information providing unit 407.

The display control unit 409, implemented by a program executed by the CPU 301 shown in FIG. 3, causes the display device 414 to display a display screen, which indicates that there is the pedestrian 110 which cannot be seen from the vehicle 10, under control of the information providing unit 407.

The terminal list management unit (second list management unit) 410 is implemented by a program executed by the CPU 301 shown in FIG. 3. The terminal list management unit 410 stores the terminal information on the mobile terminal 111, which is included in the first signal received by the first communication control unit 401, in a terminal list 601 such as the one shown in FIG. 6A, and manages the stored terminal information.

FIG. 6A shows an example of the terminal list (second list) 601 according to one embodiment. In the example shown in FIG. 6A, the terminal list 601 includes the information "terminal ID", "terminal type", "position information", "reception time", and so on.

The "terminal ID", which is included in the received first signal, indicates the terminal ID of the mobile terminal 111 that sent the first signal. The "terminal type", which is included in the first signal, is the information indicating the terminal type of the mobile terminal 111 that sent the first signal. The "position information", which is included in the first signal, is the coordinate information indicating the latitude, longitude, and altitude of the mobile terminal 111 that sent the first signal. The "reception time" is the information indicating the time when the first communication control unit 401 received the first signal. The "terminal type" and the "location information" are optional and are not indispensable.

The detection object list management unit (first list management unit) 411 is implemented by a program executed by the CPU 301 shown in FIG. 3. The detection object list management unit 411 stores, in a detection object list 602 such as the one shown in FIG. 6B, the information on the mobile terminals 111 from which the first signal was received and from which the second signal was also received as well as the information on the pedestrians 110 who carry those mobile terminals 111. The detection object list management unit 411 also manages the information stored in this list.

FIG. 6B shows an example of the detection object list (first list) according to one embodiment. In the example in FIG. 6B, the detection object list includes the information such as "tracking ID", "terminal ID", "detected coordinates", "detection time" and so on. The "tracking ID" is the identification information that identifies a currently-tracked detection object. The "terminal ID" is the identification information on the mobile terminal 111 carried by a currently-tracked detection object. The "detected coordinates" are the coordinates in the image data at which the detection object was detected by the image processing unit 404. The "detection time" is the time at which the detection object was detected by the image processing unit 404.

The detection object list management unit 411 performs the tracking processing for a detection object that is detected. For example, the detection object list management unit 411 calculates the distance between the coordinates of the detection object in the image data detected by the image processing unit 404 and the detected coordinates of the detection object that is detected (currently tracked) and, then, determines whether the calculated distance is within a predetermined distance. Note that the predetermined distance is, for example, a predetermined distance that the detection object can move within a predetermined time.

If the calculated distance is within the predetermined distance, the detection object list management unit 411 determines that the detection object detected by the image processing unit 404 is a currently-tracked detection object, and updates the detected coordinates and the detection time corresponding to the tracking ID.

On the other hand, if the calculated distance is not within the predetermined distance, the detection object list management unit 411 determines that the detection object detected by the image processing unit 404 is a new detection object. In this case, when the second signal is received by the detection processing that will be described later, the detection object list management unit 411 newly adds a tracking ID and starts tracking the detection object.

The storage unit 412 is implemented by a program executed by the CPU 301 shown in FIG. 3 and by the storage device 304 and the RAM 302. The storage unit 412 stores various pieces of information including the terminal list 601 and the detection object list 602 described above.

The communication device 101 includes a first communication unit 421 and a second communication unit 422. The first communication unit 421 communicates with the mobile terminals 111 within the communication range 201 of S1, such as those shown in FIG. 2A or 2B, via S1 (first wireless communication) using one or more antennas 424 *a*, 424 *b*, . . . , mounted on the vehicle 10.

For example, the first communication unit 421 receives the first signal from the mobile terminals 111 around the vehicle 10 under control of the first communication control unit 401 of the in-vehicle device 100, and notifies the received first signal to the in-vehicle device 100. In addition, the first communication unit 421 sends the notification information to the mobile terminal 111 with the specified terminal ID under control of the first communication control unit 401.

The second communication unit 422 communicates with the mobile terminal 111 that is present in a specified direction via directional S2 (second wireless communication), using one or more antennas 424 *a*, 424 *b*, . . . , mounted on the vehicle 10.

For example, the second communication unit 422 sends the request signal in a specified direction under control of the second communication control unit 402 of the in-vehicle device 100 and receives the second signal that is the response signal returned in response to the request signal. Then, the second communication unit 422 notifies the in-vehicle device 100 that the second signal has been received.

Figure 7:
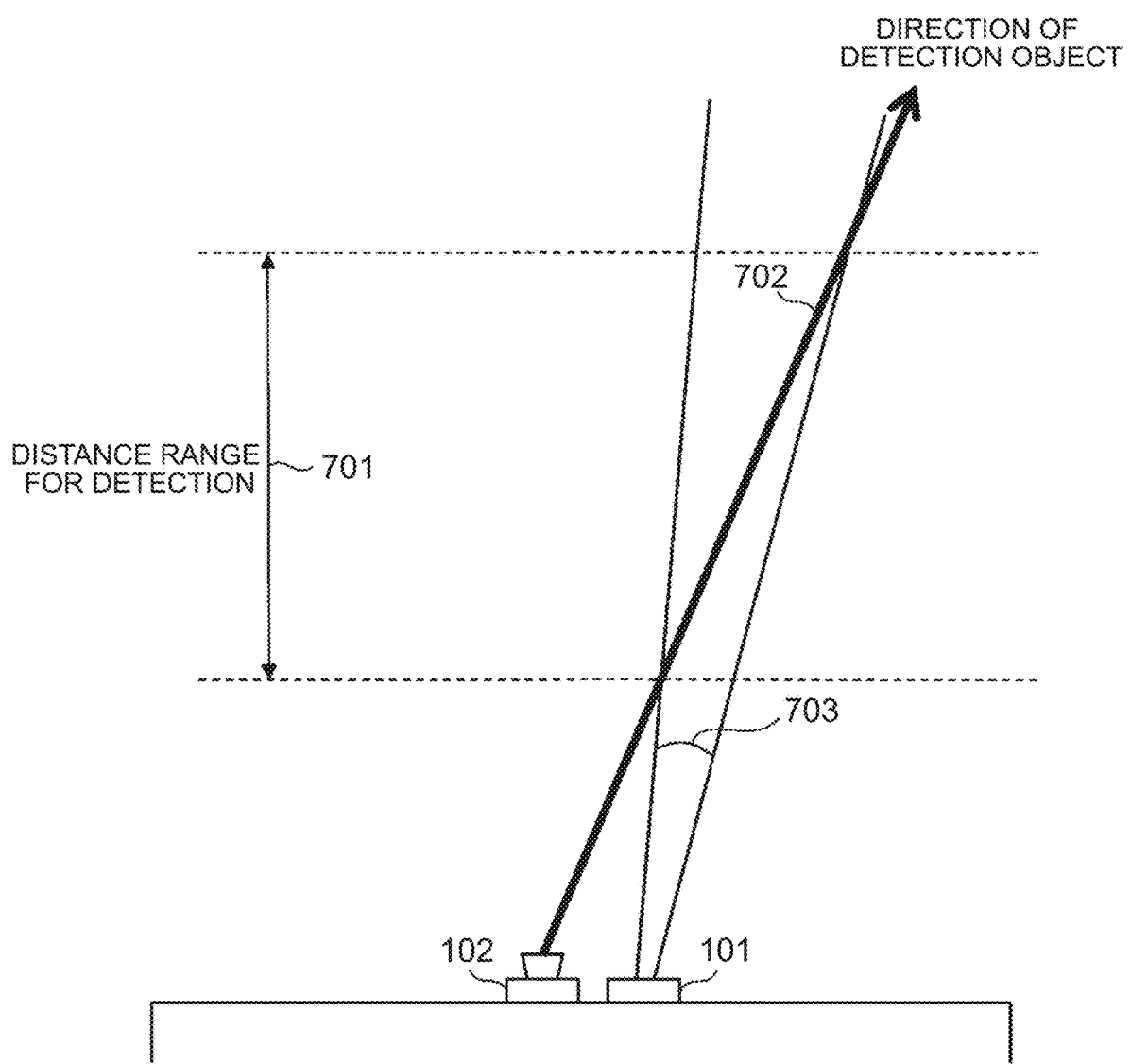
FIG. 7 is a diagram showing an image of a communication direction of S2 according to one embodiment.

FIG. 7 is a diagram showing an image of the communication direction of S2 according to one embodiment. For example, the second communication unit 422 of the communication device 101 uses the beamforming technology, or switches among a plurality of directional antennas, to perform directional wireless communication (S2) in which radio signals are sent and received within a predetermined range 703 in the specified direction.

At this time, it is preferable that a distance range 701 for detecting a detection object, such as the pedestrian 110, be predetermined, for example, as shown in FIG. 7. In this case, the second communication unit 422 sets the communication direction of S2 under control of the second communication control unit 402 so that, in the distance range 701 in which a detection object is to be detected, the direction 702 of the detection object, calculated by the calculation unit 405, is included in the predetermined range 703.

Note that Dedicated Short Range Communication (DSRC) conforming to the IEEE 802.11p standard or the V2X communication, such as the cellular V2X communication based on the cellular technology, may be applied to the first communication unit 421 and the second communication unit 422.

The V2X communication is a general term for communication between a vehicle and another communication object. For example, the V2X communication includes vehicle-to-pedestrian communication (V2P), in which communication is performed between a vehicle and a pedestrian terminal, and vehicle-to-vehicle communication (V2V) in which communication is performed between a vehicle and another vehicle.

The first communication unit 421 and the second communication unit 422 may be a communication unit that communicates with the mobile terminal 111 through DSRC or V2P communication such as cellular V2X communication. However, the communication method is not limited to the communication method described above. The first communication unit 421 and the second communication unit 422 may communicates with the mobile terminal 111 via S1 and S2, using a communication method different from the general V2X communication. In addition, the first communication unit 421 and the second communication unit 422 may be implemented by one communication unit 423.

The mobile terminal 111 is an information terminal having the configuration of a general computer. The communication control unit 431 and the alarm control unit 433 are implemented by executing the application program corresponding to the information providing system 1.

The communication control unit 431 wirelessly communicates with the communication device 101 of the vehicle 10 via the wireless unit 432 of the mobile terminal 111.

For example, the communication control unit 431 sends the first signal, which includes the terminal ID of the mobile terminal 111, in the broadcast mode via the wireless unit 432. By sending the first signal in this way, the mobile terminal 111 can notify the surrounding vehicles about the presence of itself.

Preferably, the first signal includes the information such as the information on the terminal type of the mobile terminal 111 and the position information indicating the position of the mobile terminal 111.

Furthermore, when the request signal sent from the communication device 101 of the vehicle 10 is received via the wireless unit 432, the communication control unit 431 returns the second signal, which includes the terminal ID of the mobile terminal 111, to the communication device 101 from which the request signal was sent.

Furthermore, when the notification information sent from the communication device 101 of the vehicle 10 is received via the wireless unit 432, the communication control unit 431 notifies the alarm control unit 433 about the received notification information.

When the notification information notified from the communication control unit 431 is accepted, the alarm control unit 433 outputs an alarm, such as a warning sound or a voice message, indicating that the detection object cannot be seen from the vehicle 10, using a speaker 434 of the mobile terminal 111. Note that the alarm control unit 433 may output an alarm using the vibrator or the display of the mobile terminal 111.

Next, the flow of the processing of the information providing method according to this embodiment will be described.

Figure 8:
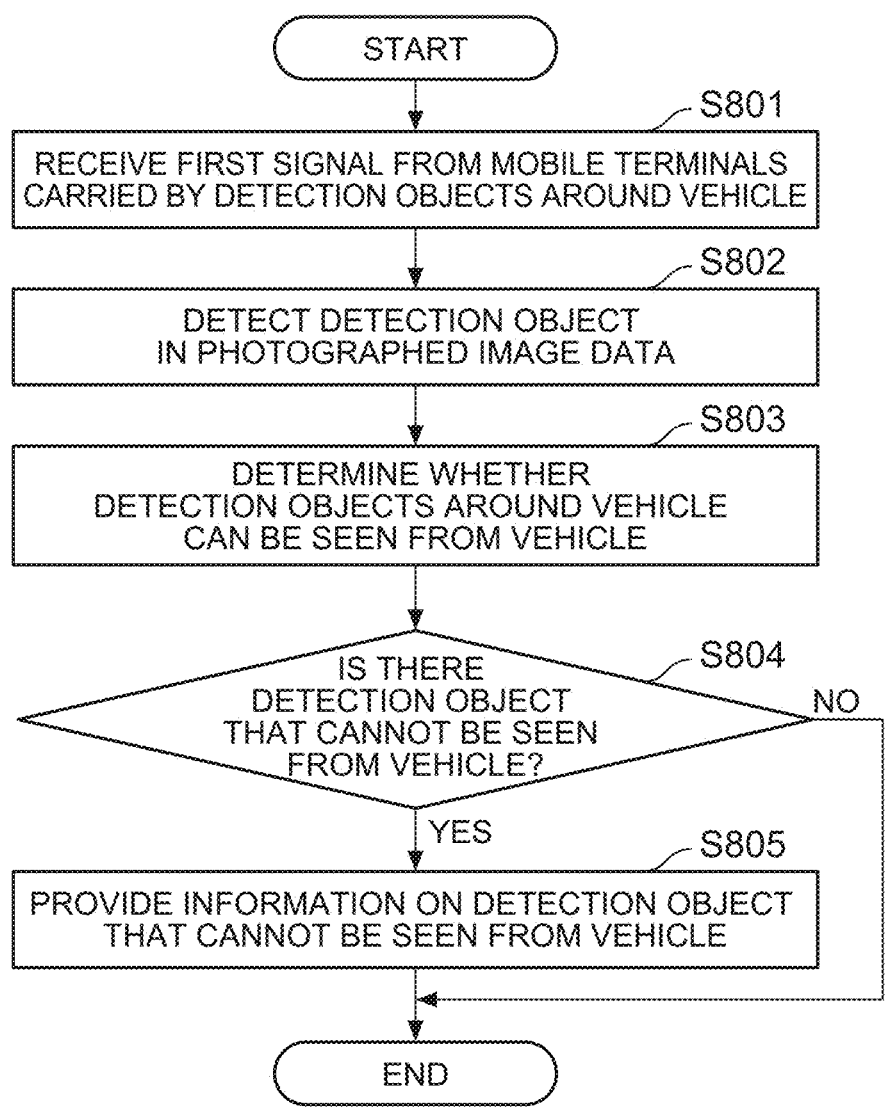
FIG. 8 is a flowchart showing a flow of the processing of the in-vehicle device according to one embodiment.

FIG. 8 is a flowchart showing the flow of the processing of the in-vehicle device according to one embodiment. This processing shows the outline of the content of the processing performed by the in-vehicle device 100. The specific processing content of each processing will be separately described with reference to the flowcharts in FIG. 9 and subsequent figures.

In step S801, the first communication control unit 401 of the in-vehicle device 100 receives, via the communication device 101, the first signal sent from one or more mobile terminals 111 carried by one or more detection objects around the vehicle 10.

For example, in the example in FIG. 2A, the first communication control unit 401 receives the first signal sent from the mobile terminals 111a, 111b, and 111c carried by the pedestrians 110a, 110b, and 110c who are present in the communication range 201 of S1.

In step S802, the image processing unit (detection unit) 404 of the in-vehicle device 100 analyzes the image data, created by the camera 102 by photographing a predetermined range that can be seen from the vehicle 10, and then detects a detection object included in the image data.

For example, in the example in FIG. 2A, the image processing unit 404 detects the pedestrian 110a captured in the photographing range 202 of the camera 102. In FIG. 2A, it is assumed that the pedestrian 110b is in a blind spot that cannot be seen from the vehicle 10 and, therefore, is not detected in the image data photographed by the camera 102.

In step S803, the determination unit 406 of the in-vehicle device 100 determines whether one or more detection objects around the vehicle 10 can be seen from the vehicle 10.

For example, in the example in FIG. 2A, the determination unit 406 determines that, though there are the pedestrians 110a, 110b, and 110c around the vehicle 10, only the pedestrian 110a can be seen as described above.

In step S804, the information providing unit 407 determines, based on the determination result of the determination unit 406, whether there is a detection object that is included in the one or more detection objects around the vehicle 10 and that cannot be seen from the vehicle 10.

For example, in the example in FIG. 2A, though there are the pedestrians 110a, 110b, and 110c around the vehicle 10, only the pedestrian 110a can be seen. Therefore, it is determined that there are detection objects (the pedestrians 110b and 110c) that cannot be seen from the vehicle 10.

If it is determined that there is a detection object that cannot be seen from the vehicle, the processing of the information providing unit 407 proceeds to step S805. On the other hand, if it is determined that there is no detection object that cannot be seen from the vehicle, the information providing unit 407 terminates the processing.

In step S805, the information providing unit 407 provides the information on a detection object that cannot be seen from the vehicle.

In one example, the information providing unit 407 outputs, via the voice output unit 408, the information (for example, an alarm sound, a voice message, etc.) indicating that there is the pedestrian 110 that cannot be seen from the vehicle 10. In another example, the information providing unit 407 sends, via the first communication control unit 401, the notification information, which indicates that there is the pedestrian 110 that cannot be seen from the vehicle 10, to the mobile terminal 111 carried by the pedestrian 110 that cannot be seen from the vehicle 10.

In this way, the in-vehicle device 100 receives the first signal from one or more mobile terminals 111 carried by one or more detection objects around the vehicle 10. In addition, from the image data created by photographing a predetermined range that can be seen from the vehicle 10, the in-vehicle device 100 detects a detection object within the predetermined range. Furthermore, based on the detection result and the received first signal, the in-vehicle device 100 provides the information on a detection object that cannot be seen from the vehicle 10 if there is a detection object that is one of the one or more detection objects and that cannot be seen from the vehicle 10.

This makes it possible for the in-vehicle device 100 that provides the information on predetermined detection objects around the vehicle 10, to provide the information on the pedestrian 110 that cannot be seen from the vehicle 10. Examples of the information on detection objects are as follows: the information notifying the occupant of the vehicle 10 that there is a pedestrian who cannot be seen from the vehicle 10 and the information notifying the mobile terminal 111 of the pedestrian 110 that the pedestrian 110 cannot be seen from the vehicle 10.

Figure 9:
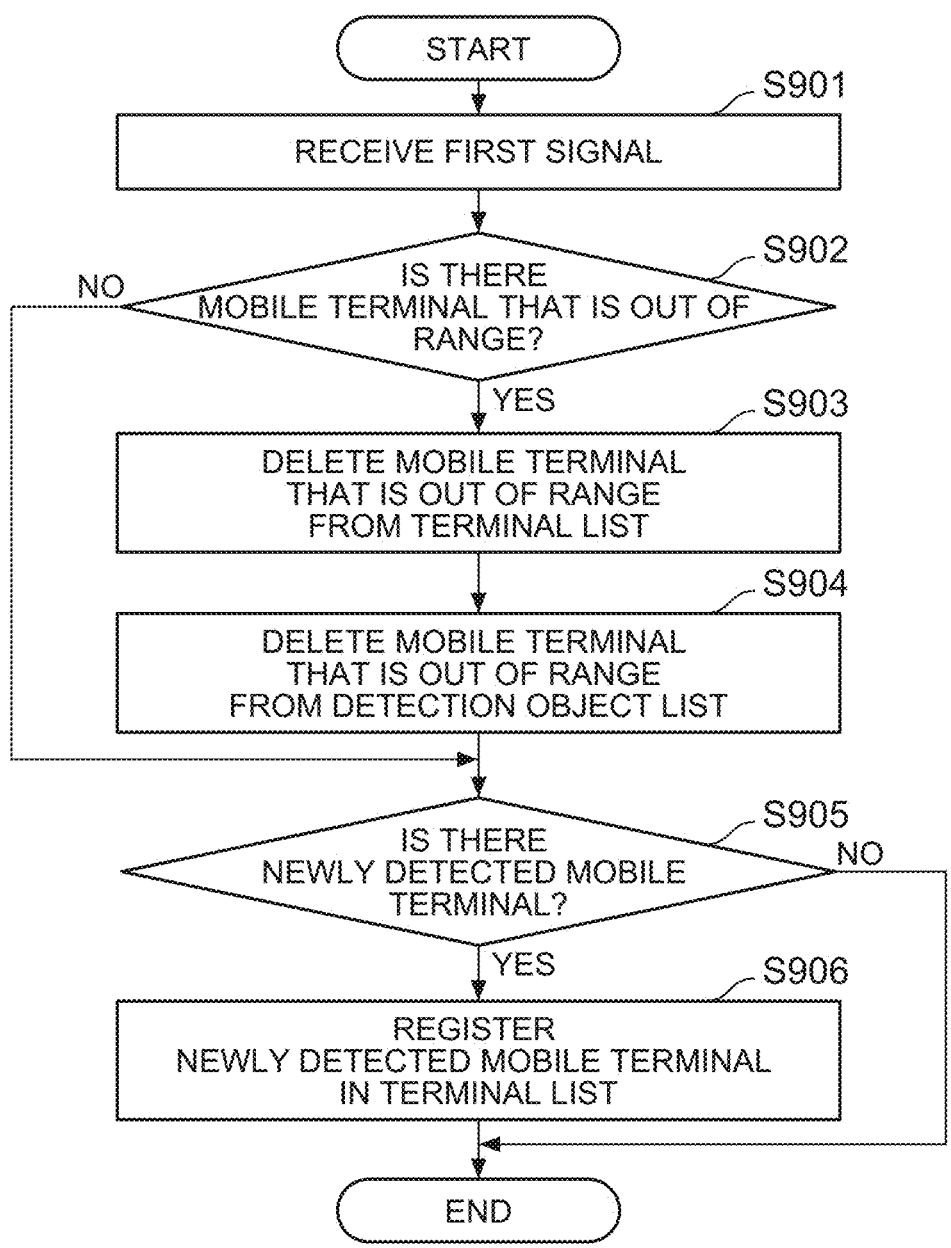
FIG. 9 is a flowchart showing an example of the reception processing of a first signal according to one embodiment.

FIG. 9 is a flowchart showing an example of the reception processing of the first signal according to one embodiment. This processing shows an example of specific processing performed in step S801 in FIG. 8.

In step S901, the first communication control unit 401 of the in-vehicle device 100 receives the first signal that is sent from the mobile terminals 111 carried by detection objects (pedestrians 110) around the vehicle 10.

In step S902, the terminal list management unit 410 of the in-vehicle device 100 determines whether there is the mobile terminal 111 that is one of the mobile terminals 111 registered in the terminal list 601 such as the one shown in FIG. 6A and that is out of range (the mobile terminal 111 that cannot receive the first signal).

If there is the mobile terminal 111 that is out of range, the processing of the terminal list management unit 410 proceeds to step S903. On the other hand, if there is no mobile terminal 111 that is out of range, the processing of the terminal list management unit 410 proceeds to step S905.

In step S903, the terminal list management unit 410 deletes the mobile terminal 111 that is out of range from the terminal list 601.

In step S904, if the mobile terminal 111 that is out of range is registered in the detection object list 602 such as the one shown in FIG. 6B, the terminal list management unit 410 deletes the information on the mobile terminal 111 that is out of range from the detection object list 602. This processing may be performed, not by the terminal list management unit 410, but by the detection object list management unit 411 in the processing shown in FIG. 10.

In step S905, the terminal list management unit 410 determines whether there is a newly detected mobile terminal 111, that is, whether the first signal was received from the mobile terminal 111 that is not registered in the terminal list 601.

If there is no newly detected mobile terminal 111, the terminal list management unit 410 terminates the processing. On the other hand, if there is the newly detected the mobile terminal 111, the terminal list management unit 410 registers, in step S906, the newly detected the mobile terminal 111 in the terminal list 601.

By performing the processing described above, the terminal list management unit 410 stores the information on the mobile terminals 111 currently around the vehicle 10 in the terminal list 601 and manages the stored information.

Figure 10:
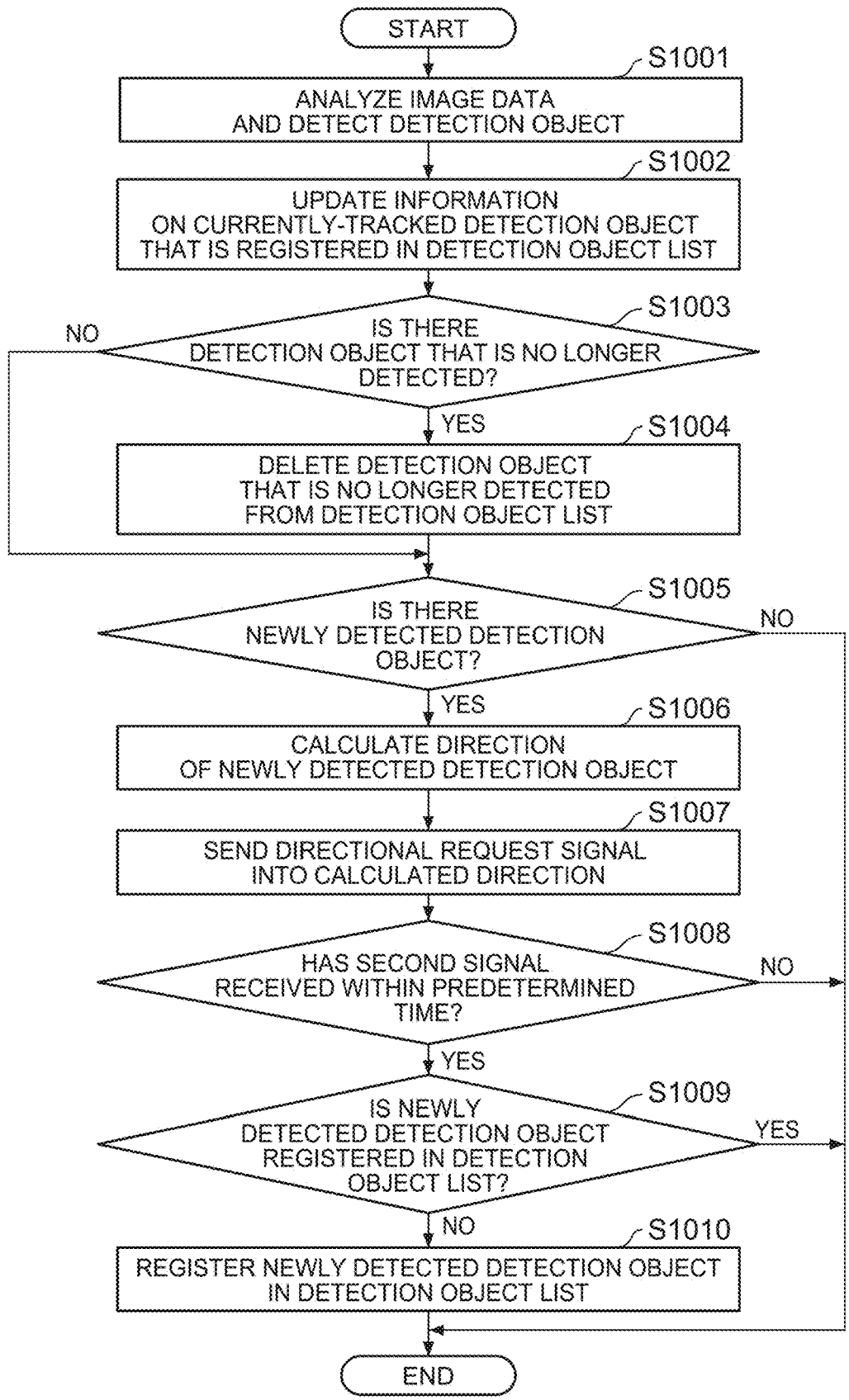
FIG. 10 is a flowchart showing an example of the detection processing according to one embodiment.

FIG. 10 is a flowchart showing an example of the detection processing according to one embodiment. This processing shows an example of specific processing performed in step S802 in FIG. 8.

In step S1001, the image processing unit 404 of the in-vehicle device 100 analyzes the image data, created by the camera 102 by photographing a predetermined range that can be seen from the vehicle 10, and detects a detection object (pedestrian) included in the image data.

In step S1002, the detection object list management unit 411 of the in-vehicle device 100 uses the information on the detection object, detected by the image processing unit 404, to update the information on a currently-tracked detection object that is registered in the detection object list 602 such as the one shown in FIG. 6B.

For example, as described above, if the distance between the detected coordinates of the detection object detected by the image processing unit 404 and the detected coordinates of the currently-tracked detection object registered in the detection object list 602 is within a predetermined distance, the detection object list management unit 411 determines that the detection object is a currently-tracked detection object. In this case, the detection object list management unit 411 updates the detection coordinates, the detection time, and so on.

In step S1003, the detection object list management unit 411 determines whether there is a detection object that is one of the currently-tracked detection objects and registered in the detection object list 602 but is no longer detected.

If there is a detection object that is no longer detected, the processing of the detection object list management unit 411 proceeds to step S1004. On the other hand, if there is no detection object that is no longer detected, the processing of the detection object list management unit 411 proceeds to step S1005.

In step S1004, the detection object list management unit 411 deletes the detection object that is no longer detected from the detection object list 602.

In step S1005, the detection object list management unit 411 determines whether there is a newly detected detection object, that is, whether a detection object that is not registered in the detection object list 602 is newly detected.

If there is a newly detected detection object, the processing of the detection object list management unit 411 proceeds to step S1006. On the other hand, if there is not a newly detected detection object, the detection object list management unit 411 terminates the processing.

In step S1006, the calculation unit 405 of the in-vehicle device 100 calculates the direction of the newly detected detection object. For example, as described above, the calculation unit 405 calculates the direction of the detection object with respect to the vehicle 10 from the coordinates of the detected detection object, using the correspondence information stored in advance in the storage unit 412.

In step S1007, the second communication control unit 402 of the in-vehicle device 100 uses the communication device 101 to send the request signal, which is directional, into the direction, calculated by the calculation unit 405, via S2 (second wireless communication).

In step S1008, the detection object list management unit 411 determines whether the second communication control unit 402 has received the second signal within a predetermined time (for example, 100 ms). This predetermined time is an appropriate value that is determined in advance by experiment or calculation according to the assumed use condition (for example, the moving speed of the vehicle 10, the moving speed of the detection object, etc.).

If the second signal is received within the predetermined time, the detection processing of the detection object list management unit 411 proceeds to step S1009. On the other hand, if the second signal cannot be received within the predetermined time, the detection object list management unit 411 terminates the processing.

If the second signal cannot be received in step S1008, the detection object list management unit 411 may make a final determination after retrying the signal reception several times (for example, three times) considering a case when the communication is unstable.

In step S1009, the detection object list management unit 411 determines whether the information (e.g., terminal ID) on the mobile terminal 111, from which the received second signal was sent, is already registered in the detection object list 602.

If the information on the mobile terminal 111 is already registered in the detection object list 602, the detection object list management unit 411 terminates the processing. On the other hand, if the information on the mobile terminal 111 is not yet registered in the detection object list 602, the detection object list management unit 411 registers, in step S1010, the newly detected detection object in the detection object list 602.

If there is a plurality of newly detected detection objects in step S1005, the in-vehicle device 100 performs the processing of steps S1006 to S1010 for each newly detected detection object.

By performing the above processing, the detection object list management unit 411 stores and manages the information on the detected (currently-tracked) detection objects in the detection object list 602. This allows the in-vehicle device 100 to exclude an already detected detection object from the calculation processing performed by the calculation unit 405. This configuration, therefore, reduces the load of the in-vehicle device 100 and, at the same time, increases the processing speed of the in-vehicle device 100.

FIG. 11A and FIG. 11B are flowcharts showing an example of the determination processing according to one embodiment. This processing shows an example of specific processing performed in step S803 in FIG. 8.

FIG. 11A shows an example of the determination processing performed by the determination unit 406. In step S1101, the determination unit 406 determines whether there is the mobile terminal 111 that is newly registered in the terminal list 601 such as the one shown in FIG. 6A and that is not registered in the detection object list 602 such as the one shown in FIG. 6B.

In step S1102, the determination unit 406 causes the processing to branch to different steps depending upon whether there is the mobile terminal 111 like the one above, that is, whether there is the mobile terminal 111 that is newly registered in the terminal list 601 and that is not registered in the detection object list 602.

If there is no mobile terminal 111 like the one above, the determination unit 406 terminates the processing (or determines that there is no detection object that cannot be seen from the vehicle 10). On the other hand, if there is the mobile terminal 111 like the one above, the processing of the determination unit 406 proceeds to step S1103.

In step S1103, the determination unit 406 determines that the detection object carrying the mobile terminal 111 like the one above cannot be seen from the vehicle 10.

The above processing allows the in-vehicle device 100 to exclude the mobile terminal 111 registered in the terminal list 601, but not in the detection object list 602, from the determination processing performed by the determination unit 406. This configuration, therefore, reduces the load of the in-vehicle device 100 and, at the same time, increases the processing speed of the in-vehicle device 100.

Note that the processing shown in FIG. 11A is an example only. Instead of the processing in this example, the determination unit 406 may also determine whether there is a detection object that cannot be seen from the vehicle 10 without using the terminal list 601 or the detection object list 602.

FIG. 11B shows another example of the determination processing performed by the determination unit 406. In step S1111, the determination unit 406 determines whether there is the mobile terminal 111 from which the first signal was received by the first communication control unit 401 but the second signal cannot be received by the second communication control unit 402.

For example, for each of the detected detection objects, the determination unit 406 causes the calculation unit 405 to perform the calculation processing, and causes the second communication control unit 402 to perform the acquisition processing of the second signal, to determine whether there is the mobile terminal 111 from which the first signal was received but from which the second signal cannot be received.

In step S1112, the determination unit 406 causes the processing to branch to different steps depending upon whether there is the mobile terminal 111 like the one above, that is, whether there is the mobile terminal 111 from which the first signal was received but from which the second signal cannot be received.

If there is not the mobile terminal 111 like the one above, the determination unit 406 terminates the processing (or determines that there is no detection object that cannot be seen from the vehicle 10). On the other hand, if there is the mobile terminal 111 like the one above, the processing of the determination unit 406 proceeds to step S1113.

In step S1113, the determination unit 406 determines that the detection object carrying the mobile terminal 111 like the one above cannot be seen from the vehicle 10.

In the above processing, the determination unit 406 can identify the mobile terminal 111 carried by the pedestrian 110 around the vehicle 10 by checking the terminal ID included in the first signal. In addition, the determination unit 406 can identify the pedestrian 110 who is one of the pedestrians detected by the image processing unit 404 and who carries the mobile terminal 111, that is, the mobile terminal 111 carried by the detection object that can be seen from the vehicle 10, by checking the terminal ID included in the second signal.

Therefore, by performing the above processing, the determination unit 406 can correctly determine whether pedestrian 110 around the vehicle 10 can be seen, using the first signal received by the first communication control unit 401 and the second signal received by the second communication control unit 402.

More specifically, the determination unit 406 determines that a detection object carrying the mobile terminal 111, from which the first signal was received but from which the second signal cannot be received, cannot be seen from the vehicle 10. In this way, the determination unit 406 can correctly determine the detection objects that are around the vehicle 10 but cannot be seen.

Figure 12B:
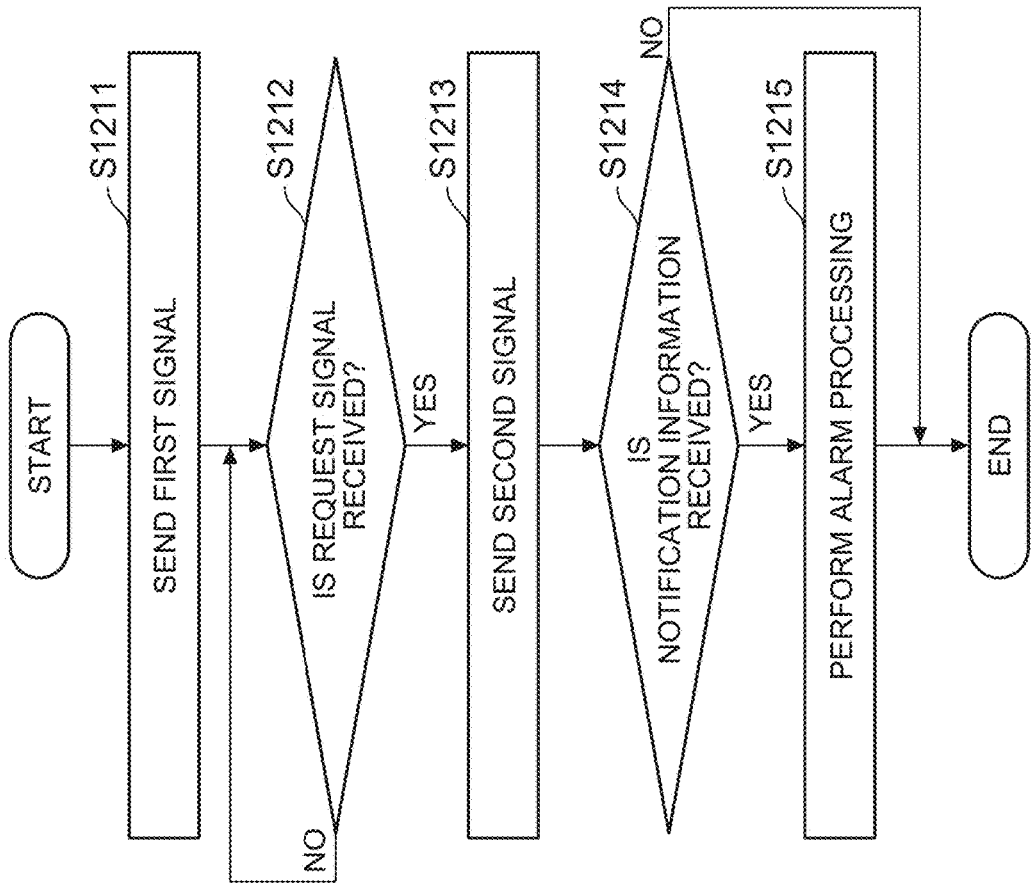
FIG. 12B is a flowchart showing an example of the processing of a mobile terminal according to one embodiment.
Figure 12A:
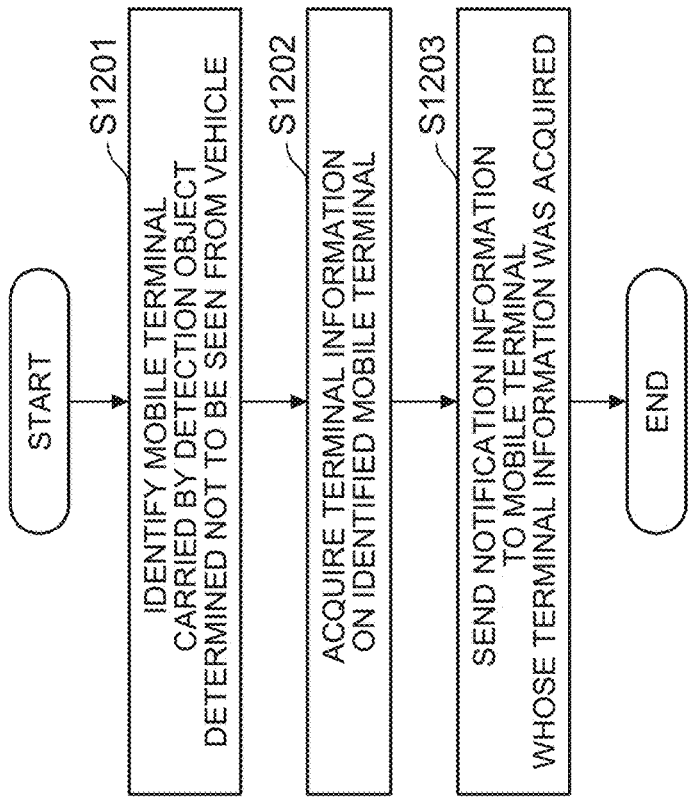
FIG. 12A is a flowchart showing an example of the information providing processing for a mobile terminal according to one embodiment.

FIG. 12A is a flowchart showing an example of the information providing processing for a mobile terminal according to one embodiment.

FIG. 12A is a flowchart showing an example of the information providing processing for the mobile terminal 111 performed by the information providing unit 407. This processing shows a specific example of the processing performed in step S805 in FIG. 8. In step S1201, the information providing unit 407 identifies the mobile terminal 111 carried by a detection object determined not to be seen from the vehicle 10.

In step S1202, the information providing unit 407 acquires the terminal information (e.g., terminal ID) on the mobile terminal 111 specified in step S1201.

In step S1203, the information providing unit 407 sends the notification information, which indicates that the detection object cannot be seen from the vehicle 10, to the mobile terminal 111 whose terminal information was acquired in step S1202. For example, the information providing unit 407 sends the notification information to the mobile terminal 111 having the terminal ID acquired in step S1202, using the first communication unit 421.

FIG. 12B shows an example of the processing of the mobile terminal 111. This processing shows an example of the processing on the mobile terminal 111 side corresponding to the processing of the in-vehicle device 100 side shown in FIG. 8. In step S1211, it is assumed that the communication control unit 431 of the mobile terminal 111 continuously sends the first signal, which includes the terminal ID of the mobile terminal 111, using the wireless unit 432.

In step S1212, the communication control unit 431 of the mobile terminal 111 determines whether the request signal sent from the in-vehicle device 100 is received.

If the request signal sent from the in-vehicle device 100 is received, the processing of the communication control unit 431 of the mobile terminal 111 proceeds to step S1213.

In step S1213, the communication control unit 431 of the mobile terminal 111 sends the second signal, which includes the terminal ID of the mobile terminal 111, to the in-vehicle device 100 that sent the request signal.

In step S1214, the alarm control unit 433 of the mobile terminal 111 determines whether the notification information is received within a predetermined time after the communication control unit 431 sent the second signal. If the notification information cannot be received within the predetermined time, the alarm control unit 433 terminates the processing. On the other hand, if the notification information is received within the predetermined time, the processing of the alarm control unit 433 proceeds to step S1215.

In step S1215, the alarm control unit 433 performs the predetermined alarm processing. For example, the alarm control unit 433 notifies the pedestrian 110 who carries the mobile terminal 111 that the pedestrian 110 cannot be seen from the vehicle 10 using a predetermined alarm sound, a voice message, or a vibration pattern generated by a vibrator. Note that these processing are merely an example, and the content of the alarm processing performed on the mobile terminal 111 may be any processing determined by an application program installed in the mobile terminal 111.

If it is determined in step S804 in FIG. 8 that there is a detection object that cannot be seen from the vehicle 10, the information providing unit 407 of the in-vehicle device 100 provides the notification information, which indicates that the detection object cannot be seen from the vehicle 10, to the occupant of the vehicle in step S805.

Preferably, to the occupant of the vehicle, the information providing unit 407 provides the notification information that corresponds to the terminal information on the mobile terminal 111 carried by the pedestrian 110 who cannot be seen from the vehicle 10 and that indicates that the pedestrian 110 cannot be seen from the vehicle 10.

FIG. 13A is a diagram showing an example of the information providing processing for the occupant of the vehicle according to one embodiment. This processing shows an example of the processing that is performed when the information providing unit 407 provides, to the occupant of the vehicle, the notification information that corresponds to the terminal information on the mobile terminal 111 carried by the pedestrian 110 who cannot be seen from the vehicle 10 and that indicates that the pedestrian 110 cannot be seen from the vehicle 10.

In step S1301, the information providing unit 407 identifies the mobile terminal 111 carried by a detection object that cannot be seen from the vehicle 10.

In step S1302, the information providing unit 407 acquires the terminal information on the mobile terminal 111 identified in step S1201. For example, the information providing unit 407 acquires the terminal information (for example, terminal type, position information, etc.) on the mobile terminal 111, identified in step S1201, from the terminal list 601 such as the one shown in FIG. 6A.

Note that the terminal type of the mobile terminal 111 is not limited to a "pedestrian terminal", but may include one or more terminal types such as a "kid phone" indicating that the terminal is the mobile terminal 111 carried by a child, a "bicycle phone" indicating that the mobile terminal 111 is attached to a bicycle, and so on.

In step S1303, the information providing unit 407 provides the information on the detection object that corresponds to the terminal information acquired in step S1302 and that cannot be seen from the vehicle 10. For example, as shown in FIG. 13B, the information providing unit 407 uses the voice output unit 408 to output a voice message or an alarm sound that differs depending on the terminal type of the mobile terminal 111.

The example shown in FIG. 13B indicates that the information providing unit 407 outputs a voice message "there is a pedestrian in invisible place" or alarm sound 1 when the terminal type acquired in step S1302 is a "pedestrian terminal". Similarly, the example indicates that the information providing unit 407 outputs a voice message "there is a child in invisible place" or alarm sound 2 when the terminal type acquired in step S1302 is a "kid phone". Furthermore, the example indicates that the information providing unit 407 outputs a voice message "there is a bicycle in invisible place" or alarm sound 3 when the terminal type acquired in step S1302 is a "bicycle phone".

As described above, the detection object to which the information providing system 1 in this embodiment provides information is not limited to the pedestrian 110 who carries the mobile terminal 111. The detection object may be a specific pedestrian carrying the mobile terminal 111 or a predetermined object (for example, a motorcycle, a bicycle, a wheelchair, etc.) on which a predetermined terminal is mounted.

FIG. 13C shows an example of the display screen that the information providing unit 407 causes the display device 414 to display. In the example in FIG. 13C, the information providing unit 407 uses the position information, included in the terminal information acquired in step S1302, to display a pedestrian icon 1311, which indicates that there is the pedestrian 110 that cannot be seen from the vehicle 10, or a display element 1312 that indicates the rough position of the pedestrian 110.

Furthermore, the information providing unit 407 may use the terminal type, included in the terminal information acquired in the step S1302 in FIG. 13A, to display an icon (a pedestrian icon, a child icon, a bicycle icon, and so on) corresponding to the detection object that cannot be seen from the vehicle 10.

In this manner, the information providing unit 407 of the in-vehicle device 100 can provide different notification information according to the terminal information on the mobile terminal 111 carried by a detection object.

Note that, in some cases, the first signal received from the mobile terminal 111 does not include the position information or the accuracy of the position information is not good. Even in such a case, the in-vehicle device 100 according to the this embodiment can detect a detection object that cannot be seen from the vehicle 10 and can provide the information on a detection object that cannot be seen from the vehicle 10.

While the embodiments of the present disclosure have been described in detail, it is to be understood that the present disclosure is not limited to the specific embodiments above but that various modifications and changes may be added without departing from the scope of the present disclosure described in claims.

For example, the mobile terminal 111 may send the first signal, not at any places, but only at pre-registered places (for example, a place determined to be dangerous based on the past statistical data).

Furthermore, it is desirable that the mobile terminal 111, carried by the occupant of the vehicle 10, have the function to stop sending the first signal or to change the terminal type when the occupant rides in the vehicle 10.

The processing described above can reduce the load of the mobile terminal 111 and the in-vehicle device 100 and, at the same time, increase the accuracy of information providing processing performed by the in-vehicle device 100.

In some cases, the photographing range 202 of the camera 102, such as the photographing range 202 shown in FIG. 2A, may include a portion that is difficult for the driver of the vehicle 10 to see. In such a case, the in-vehicle device 100 may exclude the coordinate range, included in the photographing range 202 of the camera 102 and is difficult for the driver to see, from the detection range of the detection object.

Furthermore, in a system in which the mobile terminal 111 sends the first signal that includes highly accurate position information, the in-vehicle device 100 may analyze a region that is included in the photographed image data and that corresponds to the position of the mobile terminal 111 and, if a detection object is detected, may determine that the detection object can be seen.

What is claimed is:

1. An information processing device mounted on a vehicle, the information processing device comprising: a processor configured to: receive a first signal from one or more terminals carried by one or more detection objects around the vehicle; detect the detection objects in a predetermined range from image data created by photographing the predetermined range that can be seen from the vehicle; calculate a direction of each of the detected detection objects with respect to the vehicle; carry out directional communication in the calculated direction to acquire a second signal from the terminal that is present in the calculated direction; determine that the detection object carrying a first predetermined terminal cannot be seen from the vehicle, the first predetermined terminal being a terminal from which the first signal was received but from which the second signal cannot be received; and provide information about the detection object that cannot be seen from the vehicle.

2. The information processing device according to claim 1, wherein the processor is configured to:
   manage a first list in which information on a second predetermined terminal and information on a detection object carrying the second predetermined terminal are stored, the second predetermined terminal being a terminal from which the first signal was received and from which the second signal was also received; and
   exclude the detected detection objects that are stored in the first list from the calculation of the direction.

3. The information processing device according to claim 2, wherein the processor is configured to:
   manage a second list in which information on the terminals from which the first signal was received is stored; and
   determine that the detection object carrying a third predetermined terminal cannot be seen from the vehicle, the third predetermined terminal being a terminal that is newly registered in the second list and that is not registered in the first list.

4. The information processing device according to claim 1, wherein
   the first signal includes identification information that identifies the terminal, and
   the processor is configured to send, when the one or more detection objects include the detection object that cannot be seen from the vehicle, information to the first predetermined terminal indicating that the detection object cannot be seen from the vehicle.

5. The information processing device according to claim 1, wherein
   the processor is configured to provide information indicating that there is the detection object that cannot be seen from the vehicle to an occupant of the vehicle when the one or more detection objects include the detection object that cannot be seen from the vehicle.

6. The information processing device according to claim 5, wherein
   the first signal includes terminal information on the terminal, and
   the processor is configured to provide information indicating that there is the detection object that cannot be seen from the vehicle and corresponding to the terminal information on the terminal carried by the detection object that cannot be seen from the vehicle.

7. An information providing system comprising a processor configured to: receive a first signal from one or more terminals carried by one or more detection objects around a vehicle; detect the detection objects in a predetermined range from image data created by photographing the predetermined range that can be seen from the vehicle; calculate a direction of each of the detected detection objects with respect to the vehicle; carry out directional communication in the calculated direction to acquire a second signal from the terminal that is present in the calculated direction; determine that the detection object carrying a first predetermined terminal cannot be seen from the vehicle, the first predetermined terminal being a terminal from which the first signal was received but from which the second signal cannot be received; and provide information about the detection object that cannot be seen from the vehicle.

8. An information providing method comprising: receiving, by an information processing device mounted on a vehicle, a first signal from one or more terminals carried by one or more detection objects around the vehicle; detecting, by the information processing device, the detection objects in a predetermined range from image data created by photographing the predetermined range that can be seen from the vehicle; calculating, by the information processing device, a direction of each of the detected detection objects with respect to the vehicle; carrying out, by the information processing device, directional communication in the calculated direction to acquire a second signal from the terminal that is present in the calculated direction; determining, by the information processing device, that the detection object carrying a first predetermined terminal cannot be seen from the vehicle, the first predetermined terminal being a terminal from which the first signal was received but from which the second signal cannot be received; and providing, by the information processing device, information about the detection object that cannot be seen from the vehicle.

\* \* \* \* \*